US010532774B2

(12) United States Patent
Walser

(10) Patent No.: US 10,532,774 B2
(45) Date of Patent: Jan. 14, 2020

(54) VEHICLE LIFTGATE WITH DUAL STOWABLE HOISTS

(71) Applicant: FORD GLOBAL TECHNOLOGIES, LLC, Dearborn, MI (US)

(72) Inventor: Anthony Richard Walser, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 320 days.

(21) Appl. No.: 15/232,437

(22) Filed: Aug. 9, 2016

(65) Prior Publication Data

US 2018/0043941 A1 Feb. 15, 2018

(51) Int. Cl.
*B62D 25/12* (2006.01)
*B60P 1/00* (2006.01)

(52) U.S. Cl.
CPC .............. *B62D 25/12* (2013.01); *B60P 1/003* (2013.01)

(58) Field of Classification Search
CPC .......... B60P 1/00; B60P 1/5433; B60P 1/548; B60P 1/5485; B60P 1/5495; B60P 1/549; B60P 1/003; B60P 1/4471; B60P 1/4407; B60P 1/5428; B60R 5/04; B60R 11/00; B60R 11/06; B60R 2011/0094; B60R 2011/0019; B60R 7/02; B60R 7/046; B62D 43/002; B62D 33/03; B62D 33/0273; B62D 33/023; B62D 25/12; A61G 3/0209; A61G 3/062; A61G 3/02; B66C 23/44; B66C 23/36; B66D 3/18; B66D 1/50; B60J 5/10; B60J 5/107; B64C 1/22
See application file for complete search history.

(56) References Cited

U.S. PATENT DOCUMENTS

| | | | | |
|---|---|---|---|---|
| 2,320,856 A | * | 6/1943 | Ehlers | B62D 43/06 296/37.2 |
| 3,051,419 A | * | 8/1962 | Weiland | B64C 1/22 212/74 |
| 3,561,704 A | * | 2/1971 | Schulze | B64C 1/1415 244/12.3 |
| 4,221,528 A | | 9/1980 | Gordos | |
| 4,391,379 A | | 7/1983 | Paffrath | |
| 4,858,855 A | * | 8/1989 | Dalbera | B64C 1/22 244/137.1 |

(Continued)

FOREIGN PATENT DOCUMENTS

| | | | |
|---|---|---|---|
| DE | 102014115834 A1 | 5/2015 | |
| DE | 102014224887 A1 * | 6/2016 | ............. B60R 5/044 |

(Continued)

OTHER PUBLICATIONS

English Machine Translation of DE102014115834A1.

*Primary Examiner* — Glenn F Myers
(74) *Attorney, Agent, or Firm* — Jason Rogers; Vichit Chea; King & Schickli, PLLC

(57) ABSTRACT

An apparatus for lifting an object for placement in a vehicle cargo area is provided. The apparatus comprises a liftgate for opening and closing relative to the vehicle cargo area including dual hoists for lifting an object in a balanced manner. The dual hoists may be stowed in a compartment in the liftgate, such as in individual pockets covered by a door formed by a liftgate trim panel. The actuator forming part of the hoist may also be covered by the liftgate trim panel, and thus hidden from view.

19 Claims, 5 Drawing Sheets

(56) References Cited

U.S. PATENT DOCUMENTS

| | | | | |
|---|---|---|---|---|
| 4,858,981 | A | * | 8/1989 | Post .................. E05F 15/47 |
| | | | | 296/76 |
| 5,209,435 | A | * | 5/1993 | Edwards ................ A62B 1/00 |
| | | | | 105/348 |
| 5,615,785 | A | | 4/1997 | Kaner |
| 6,547,507 | B1 | * | 4/2003 | Gest .................. B60P 1/5433 |
| | | | | 212/180 |
| 7,070,059 | B1 | | 7/2006 | Flowers et al. |
| 2004/0207226 | A1 | * | 10/2004 | Johnson .................. B60P 3/14 |
| | | | | 296/50 |
| 2007/0122260 | A1 | | 5/2007 | Zablocky et al. |
| 2007/0290180 | A1 | | 12/2007 | Kazerooni |
| 2011/0309649 | A1 | * | 12/2011 | Yamase .................. B60R 13/02 |
| | | | | 296/57.1 |

FOREIGN PATENT DOCUMENTS

| | | | | |
|---|---|---|---|---|
| EP | 2463225 | A1 | 6/2012 | |
| WO | WO-2006016993 | A2 | * 2/2006 | ............... B60R 5/04 |
| WO | 2013076668 | A2 | 5/2013 | |

* cited by examiner

VEHICLE LIFTGATE WITH DUAL STOWABLE HOISTS

TECHNICAL FIELD

This document relates generally to the motor vehicle field and, more particularly, to a vehicle liftgate with dual stowable hoists.

BACKGROUND

Motor vehicles, such as SUVs or minivans, typically include a rearwardly opening liftgate for accessing a large rear area for storage of articles, such as luggage or other cargo. Lifting objects into this area can require a significant amount of exertion. This is especially true when the items are particularly heavy.

Past proposals for the use of hoists in connection with the liftgate have proven unreliable for many reasons. For one, only a single off-center hoist is provided, which thus makes it impossible or at best difficult to raise the object in a balanced manner. Stowing the hoist out of sight when not in use is also not contemplated.

Accordingly, a need is identified for a vehicle liftgate with an improved hoisting arrangement.

SUMMARY

According to one aspect of the disclosure, an apparatus for lifting an object for placement in a vehicle cargo area is provided. The apparatus comprises a liftgate for opening and closing relative to the vehicle cargo area, and first and second hoists connected to the liftgate. By using the first and second hoists together, the object may be lifted in an even or balanced manner.

In one embodiment, the first hoist comprises a first connector for connecting to the object and a first actuator and the second hoist comprises a second connector for connecting to the object and a second actuator. The first and second actuators are recessed within a portion of the liftgate covered by a trim panel. Specifically, the liftgate includes a first pocket for receiving the first connector and first actuator and a second pocket for receiving the second connector and the second actuator. Each of the first and second pockets may be covered by a door.

The liftgate may comprise a first track for guiding the first hoist for movement toward the vehicle cargo area and a second track for guiding the second hoist for movement toward the vehicle cargo area. The first and second tracks may be generally parallel. A strut may also be provided for assuming an extended position for retaining the liftgate open, and a lock may be provided for locking the strut in the extended position when the first hoist or the second hoist is deployed.

According to a further aspect of the disclosure, an apparatus for lifting an object for placement in a vehicle cargo area is provided. The apparatus comprises a liftgate for opening and closing relative to the vehicle cargo area and including a pocket. A first hoist is adapted for being stowed in the pocket of the liftgate.

In one embodiment, the liftgate comprises a trim panel including the pocket. The trim panel may comprise a door for covering the pocket. The first hoist may further comprise an actuator hidden by the trim panel when the first hoist is stowed.

A second hoist may be connected to a second portion of the liftgate and spaced from the first hoist such that the object may be lifted by the first and second hoists in a balanced manner. The liftgate may comprise a first track for guiding the first hoist for movement toward the vehicle cargo area. A second track may also be provided for guiding the second hoist for movement toward the vehicle cargo area.

According to a further aspect of the disclosure, an apparatus for lifting an object for placement in a vehicle cargo area is provided. The apparatus comprises a liftgate for opening and closing relative to the vehicle cargo area, the liftgate including a trim panel. A first hoist is connected to the liftgate, the first hoist including an actuator hidden from view by the liftgate trim panel.

The trim panel may comprise a pocket for receiving the first hoist, and further including a door for covering the pocket. A second hoist may be connected to a second portion of the liftgate and spaced from the first hoist such that the object may be lifted by the first and second hoists in a balanced manner. A first track is provided for guiding the first hoist for movement toward the vehicle cargo area, and a second track is provided for guiding the second hoist for movement toward the vehicle cargo area.

In the following description, several embodiments of the vehicle liftgate with dual hoists are shown and described. As it should be realized, the arrangement is capable of other, different embodiments and its several details are capable of modification in various, obvious aspects all without departing from the vehicle liftgate with dual hoists as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the disclosed liftgate with dual stowable hoists, serve to explain certain principles thereof. In the drawing figures.

Reference will now be made in detail to the present preferred embodiments of a vehicle liftgate with dual stowable hoists, examples of which are illustrated in the accompanying drawing figures.

DETAILED DESCRIPTION

Figure 1:
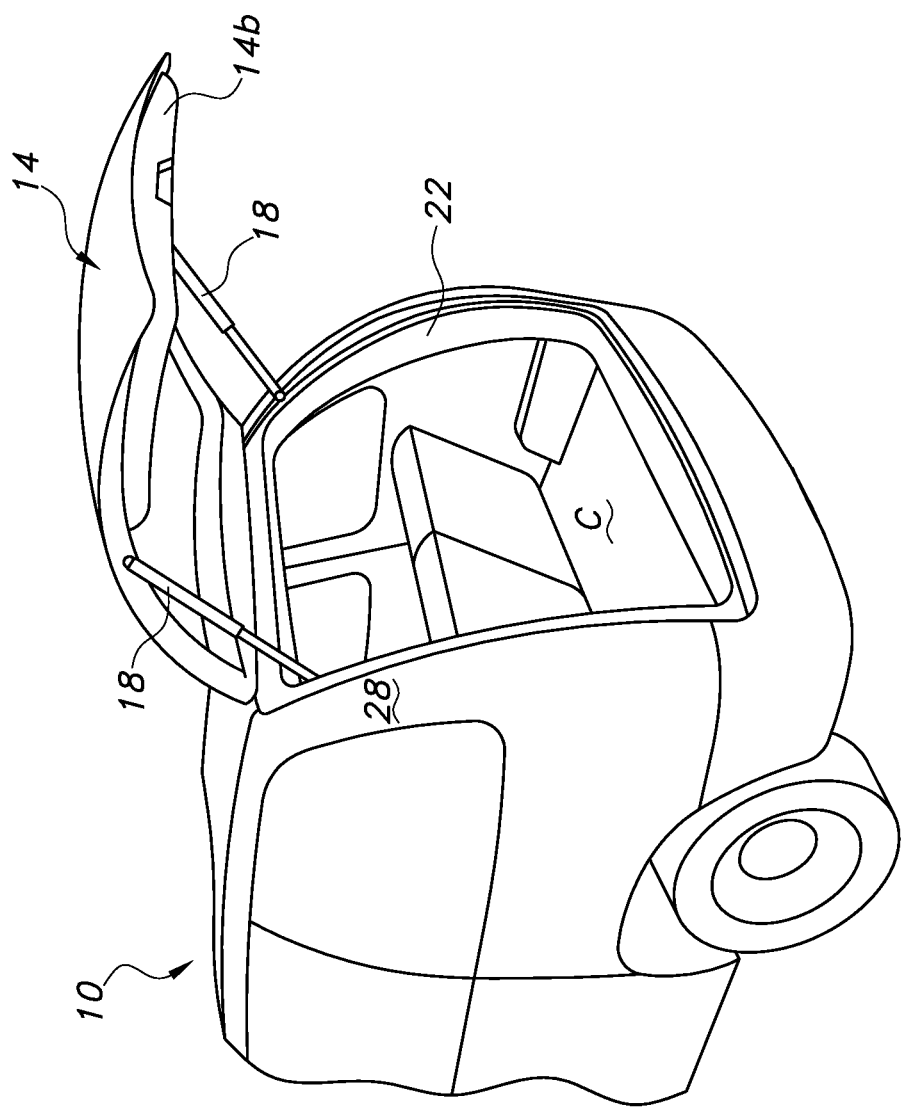
FIG. 1 is a partially cutaway rear perspective view of a vehicle including a liftgate in a raised or open position.

As shown in FIG. 1, vehicle 10 has liftgate 14, which is normally maintained in its fully opened or raised position pivoted about spaced hinges 13 by means of telescoping struts 18. Liftgate 14 and struts 18 are both attached at one end to door opening panel 22, which is located adjacent to the D-pillar 28 of the vehicle 10. The liftgate 14 thus closes and seals an interior cargo area C.

According to one aspect of the disclosure, the liftgate is 14 is provided with dual hoists 24, 26. Specifically, the hoists 24, 26 may be provided adjacent to each side of the liftgate 14, to thus allow for the simultaneous connection to and lifting of a heavy object outside of the vehicle (such as on the ground) for placement into the cargo area C. To achieve this result, the hoists 24, 26 may each comprise an actuator 38, such as a motor. The motor is connected to a cable 30 for raising and lowering (note vertical direction V) an associated connector for connecting with an object to be lifted, such as a hook 32. As can be appreciated, the use of dual hoists 24, 26 for lifting an object allows for the lifting to be done in an even or balanced manner from opposed sides or ends, thus avoiding the need for significant intervention by the user to assist with the lifting process in the typical situation where the object is an oversized container, such as a piece of luggage or a shipping crate.

Figure 2:
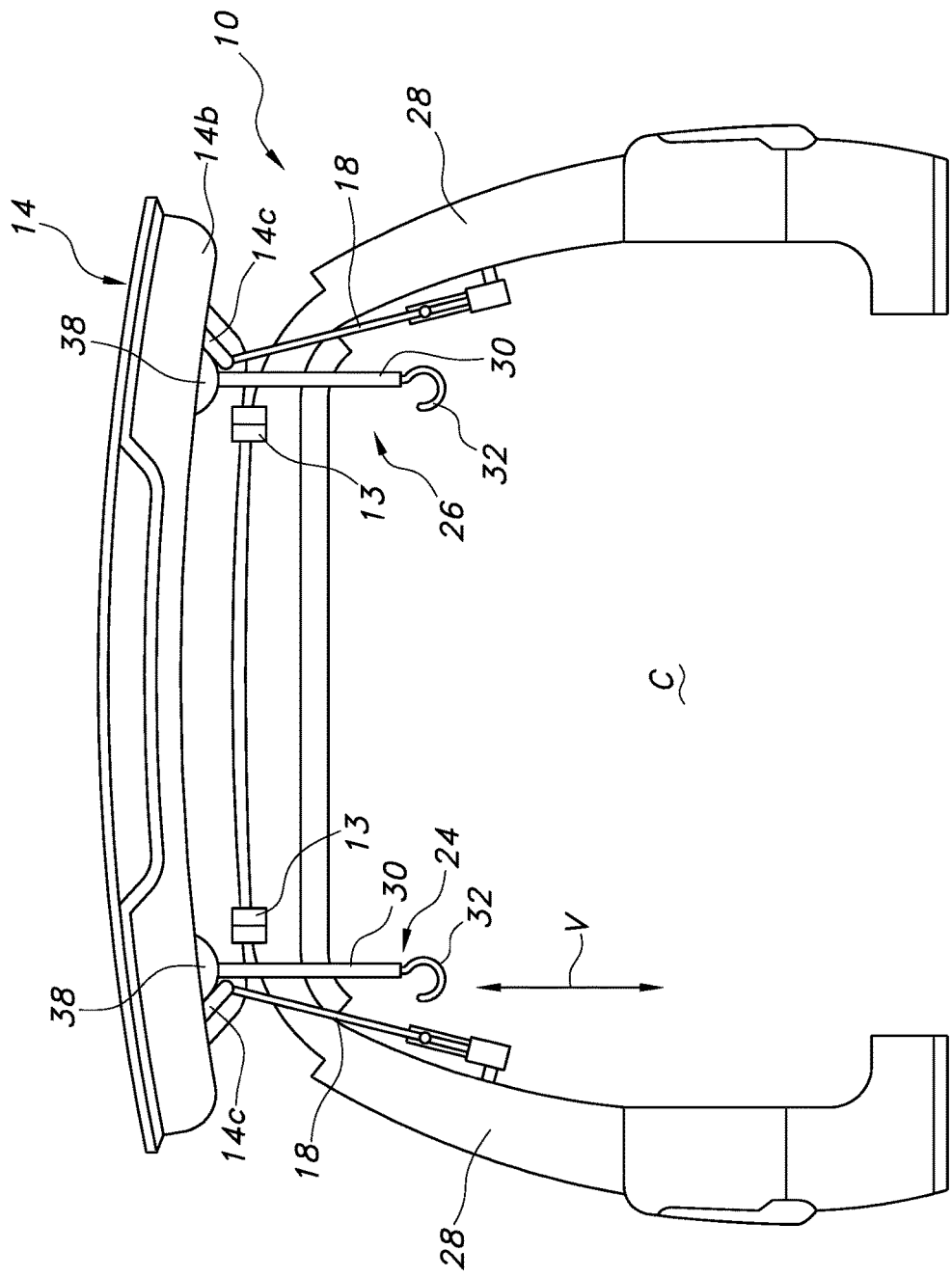
FIG. 2 is a rear view of the liftgate in the raised position, showing the dual spaced hoists in an operative condition.

A further aspect of the disclosure pertains to recessing one or both of the hoists 24, 26 within the liftgate 14. Specifically, each hoist 24, 26 may be positioned in a compartment formed in the liftgate 14 and, in particular, in a trim panel 14b when stowed and not in use. The compartment may comprise individual pockets 14a for each hoist 24, 26, but a single pocket could also be used for stowing both hoists. These pockets 14a thus provide a convenient place to stow the hoists 24, 26 when not in use. In this manner, interference is avoided with the normal operation of the liftgate 14 during raising and lowering A portion of the trim panel 14b may also comprise a hinged or removable panel or door 14c for covering the pocket 14a when the hoist 24, 26 is recessed therein. This covering shields the hoists 24, 26 from view when stowed, and thus presents the appearance of a typical liftgate to an outside observer. When ready for use, the corresponding door 14c may be opened (see FIG. 4) and the hoist(s) 24 or 26 moved to the operative position, as shown in FIGS. 2 and 4.

Figure 3:
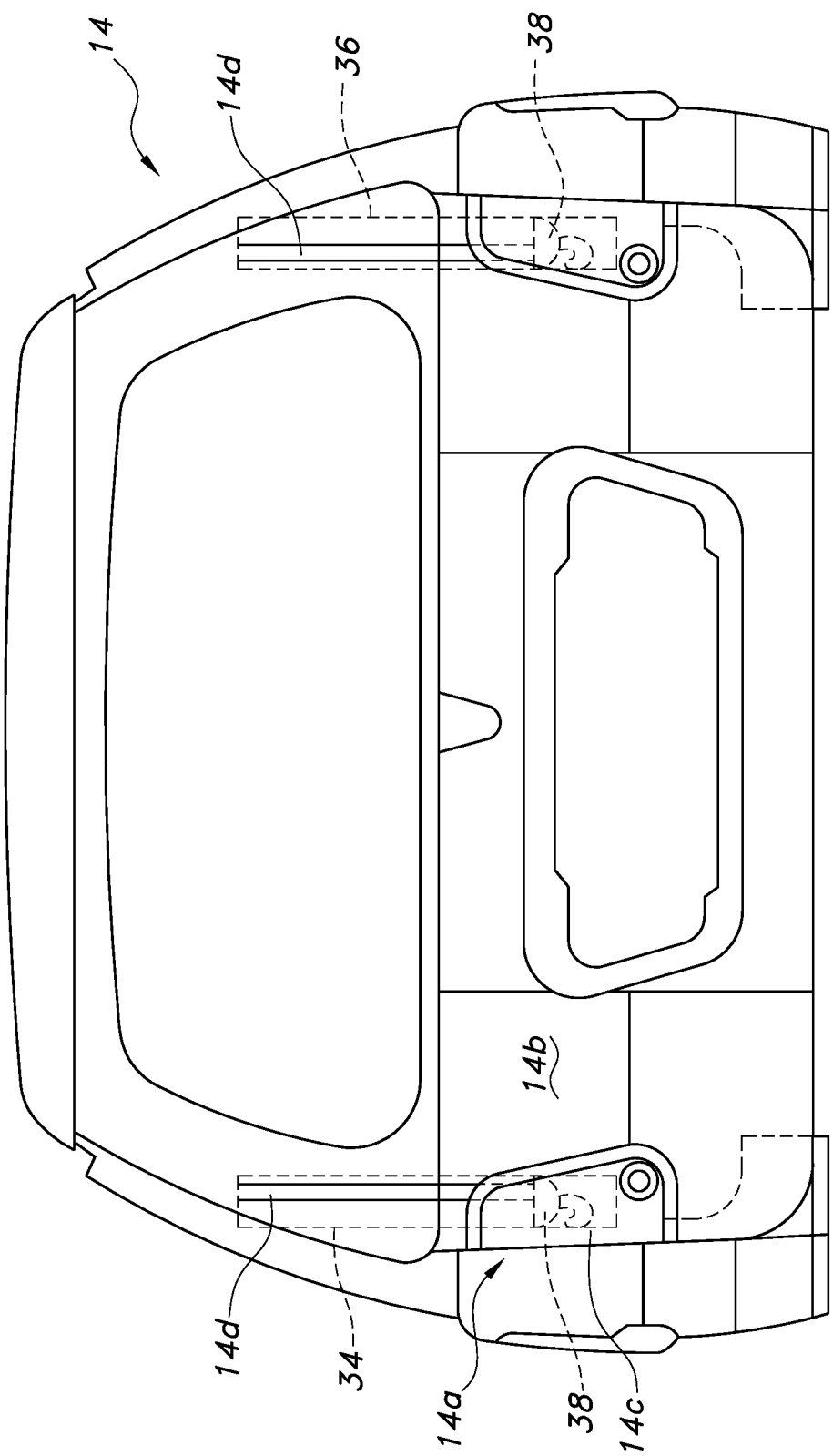
FIG. 3 is a plan view of the inside face of the liftgate including a trim panel with a pocket for stowing the hoists from view when non-operative.
Figure 4:
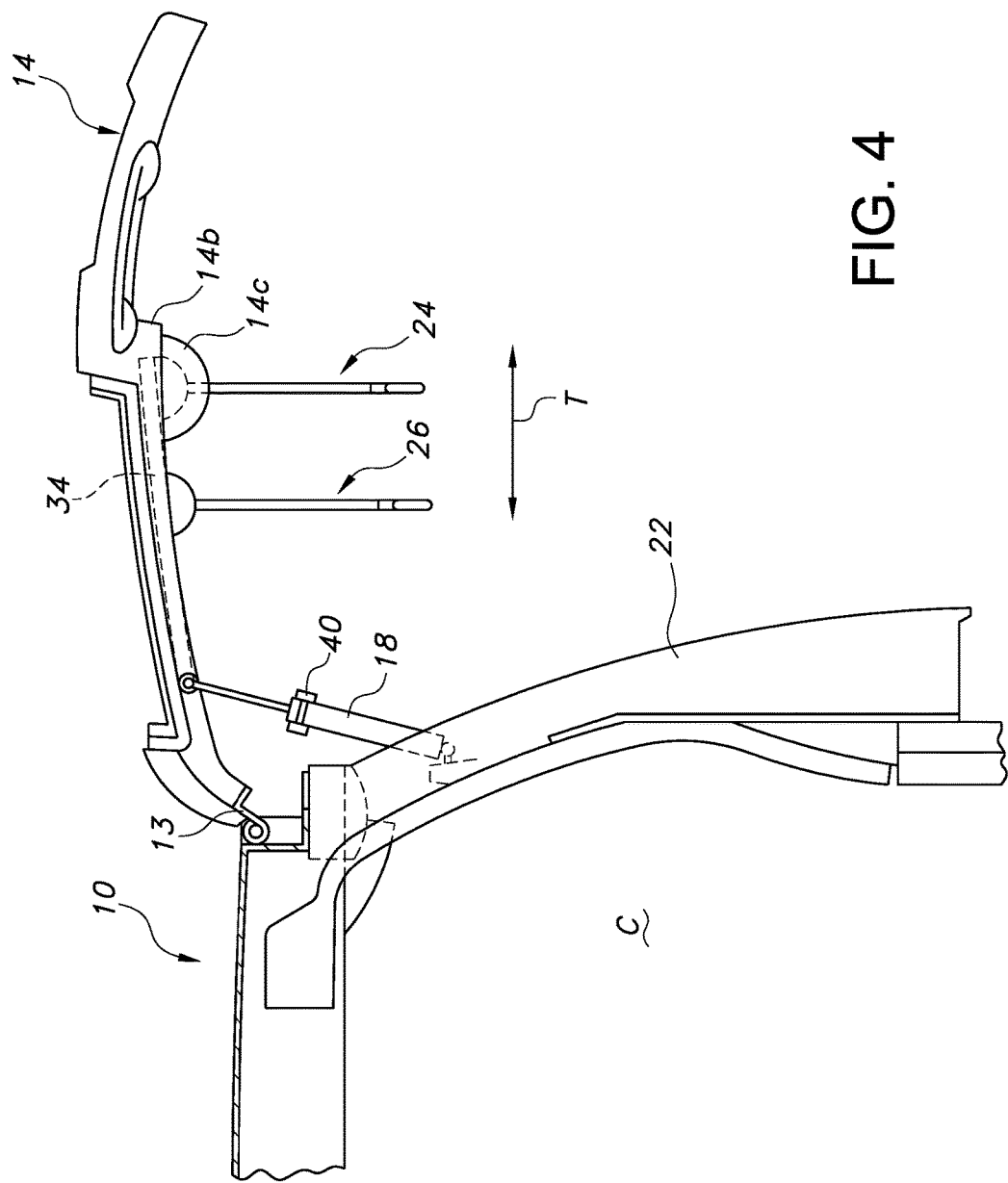
FIG. 4 is a side view of the vehicle with the open liftgate and dual hoists in the operative condition.

To allow for movement of the object into the cargo area once lifted, the hoists 24, 26 may also be adapted for moving to and fro in the travel direction T, as also indicated in FIG. 4. In the disclosed embodiment, this is achieved by providing an elongated rail or track 34, 36 (see FIG. 3) for guiding the sliding movement of each hoist 24, 26 in a linear fashion. The hoists 24, 26 may thus move independent of each other (note different positions of hoists 24 and 26 in the travel direction T in the side view of FIG. 4). The hoists 24, 26 may be driven along the track 34 either by manual push or by an actuator, such as an electric drive, in the hoist itself.

The tracks 34, 36 may be extruded rails secured or fastened (such as by bolts) in a generally parallel arrangement to the inner face of the liftgate 14 covered by the trim panel 14b, which may include exposed, open channels 14d for allowing the hoist 24 or 26 to move in the intended manner in direction T. The tracks 34, 36 may specifically interface with a lift motor serving as the actuator 38 for raising and lowering the rope 30 (such as by winding around a reel), which actuator is thus hidden by the trim panel 14b when not in use (such as when positioned in pocket 14a).

Figure 5:
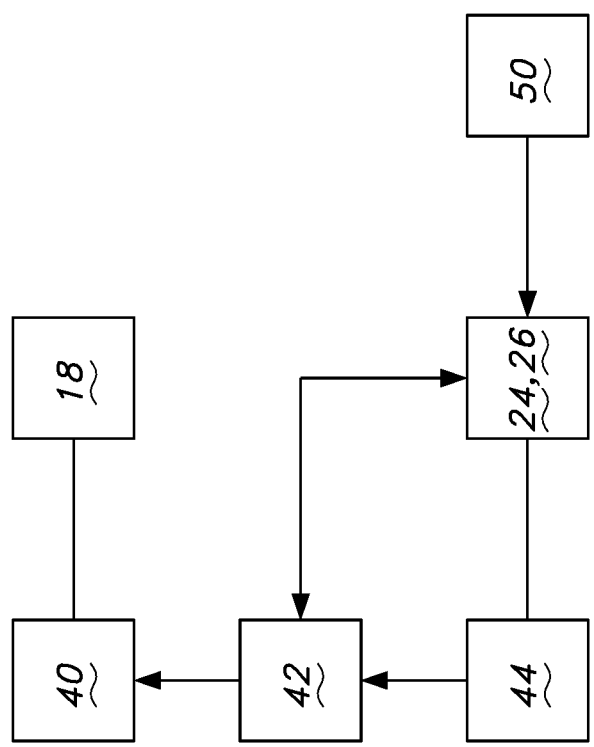
FIG. 5 is a schematic diagram illustrating a lockout feature for maintaining the liftgate in the raised or open condition during the loading of the dual hoists.

A further feature that may be desirable is to provide a lockout condition for preventing the liftgate 14 from moving from a fully open or raised condition toward the closed position while either hoist 24, 26 is deployed. When passive struts 18 are used, this may be achieved by using a lock 40, such as a solenoid, for moving to a position for locking one or both of the struts in the extended position associated with the open liftgate 14. As indicated in FIG. 5, the lock 40 may be activated by a controller 42 associated with a detector 44 associated with one or each of the hoists 24, 26 for detecting deployment to thus activate the lockout condition. In the case of an active strut arrangement, such as a powered lift, the controller 42 may simply lockout the operation for raising and lowering the liftgate 14.

As further indicated, an input 50 may be provided for controlling the hoists 24, 26. The input may take the form of one or more push buttons or switches on the body of each actuator 38 for raising and lowering the rope 30. Via controller 42, the hoists 24, 26 may also be made to operate in concert using a single input signal. The controller 42 may also be a remote or handheld computer, such as a smart phone, which can be used to control the hoists 24, 26 together or independently such as by issuing a wireless signal to the actuators 38 or an intermediate control module (not shown).

In summary, an improved hoist arrangement for a vehicle 10 is provided. The arrangement comprises dual hoists 24, 26 arranged to lift an object, such as a heavy piece of luggage, in an even and reliable manner. The hoists 24, 26 may be hidden when stowed in a pocket 14a formed in the liftgate trim panel 14b, and then deployed for use in lifting objects in concert. Deployment may create a lockout condition to prevent the liftgate 14 from closing during the lifting operation. Overall, a more robust, reliable, and user-friendly lifting arrangement for the vehicle 10 is provided.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus for lifting an object outside a vehicle into a vehicle cargo area, comprising:
    a liftgate for opening and closing relative to the vehicle cargo area;
    a first hoist connected to the liftgate; and
    a second hoist connected to the liftgate and spaced from the first hoist such that the object may be lifted from outside the vehicle into the vehicle cargo area by the first and second hoists in a balanced manner.

2. The apparatus of claim 1, wherein the first hoist comprises a first connector for connecting to the object outside the vehicle when the liftgate is open and a first actuator and the second hoist comprises a second connector for connecting to the object outside of the vehicle when the liftgate is open and a second actuator.

3. The apparatus of claim 1, wherein the first and second actuators are recessed within a portion of the liftgate and the first and second actuators are covered by a trim panel.

4. The apparatus of claim 2, wherein the liftgate includes a first pocket for receiving the first connector and first actuator and a second pocket for receiving the second connector and the second actuator.

5. The apparatus of claim 4, wherein each pocket is covered by a door.

6. The apparatus of claim 1, wherein the liftgate comprises a first track for guiding the first hoist for movement toward the vehicle cargo area and a second track for guiding the second hoist for movement toward the vehicle cargo area.

7. The apparatus of claim 6, wherein the first and second tracks are generally parallel.

8. The apparatus of claim 1, further including a strut for assuming an extended position for retaining the liftgate open, and further including a lock for locking the strut in the extended position when the first hoist or the second hoist is deployed, and a controller for controlling the lock for locking the strut when the first hoist or the second hoist is deployed.

9. A vehicle including the apparatus of claim 1.

10. An apparatus for lifting an object for placement in a vehicle cargo area, comprising: a liftgate for opening and closing relative to the vehicle cargo area, the liftgate including a pocket; and
 a first hoist including a connector, the first hoist and connector adapted for being stowed in the pocket of the liftgate; and
 wherein the liftgate comprises a trim panel including the pocket.

11. The apparatus of claim 10, wherein the trim panel comprises a door for covering the pocket and the first hoist when stowed therein.

12. The apparatus of claim 10, wherein the first hoist comprises an actuator covered by the trim panel when the first hoist is stowed.

13. The apparatus of claim 10, further including a second hoist connected to a second portion of the liftgate and spaced from the first hoist such that the object may be lifted by the first and second hoists in a balanced manner.

14. The apparatus of claim 13, wherein the liftgate comprises a first track for guiding the first hoist for movement toward the vehicle cargo area and a second track for guiding the second hoist for movement toward the vehicle cargo area.

15. A vehicle including the apparatus of claim 10.

16. An apparatus for lifting an object for placement in a vehicle cargo area, comprising:
 a liftgate for opening and closing relative to the vehicle cargo area, the liftgate including a trim panel; and
 a first hoist connected to the liftgate, the first hoist including a connector and an actuator, both hidden from view by the liftgate trim panel.

17. The apparatus of claim 16, wherein the trim panel comprises a pocket for receiving the first hoist, and further including a door for covering the pocket and the first hoist.

18. The apparatus of claim 16, further including:
 a second hoist connected to a second portion of the liftgate and spaced from the first hoist such that the object may be lifted by the first and second hoists in a balanced manner;
 a first track for guiding the first hoist for movement toward the vehicle cargo area; and
 a second track for guiding the second hoist for movement toward the vehicle cargo area.

19. A vehicle including the apparatus of claim 18.

* * * * *